(12) United States Patent
Dupont

(10) Patent No.: US 8,430,163 B2
(45) Date of Patent: Apr. 30, 2013

(54) DOWNHOLE ACOUSTIC SENSING TOOL AND METHOD

(75) Inventor: Hugues Dupont, Tokyo (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 474 days.

(21) Appl. No.: 12/722,527

(22) Filed: Mar. 12, 2010

(65) Prior Publication Data
US 2011/0220411 A1    Sep. 15, 2011

(51) Int. Cl.
*E21B 47/01* (2006.01)
(52) U.S. Cl.
USPC .................................. 166/250.11; 73/152.17
(58) Field of Classification Search ............. 166/250.01, 166/250.11, 66, 100; 73/152.17
See application file for complete search history.

(56) References Cited

U.S. PATENT DOCUMENTS 4,109,717 A * 8/1978 Cooke, Jr. ................. 166/250.1
6,981,550 B2 * 1/2006 Haheim et al. ........... 166/250.11

FOREIGN PATENT DOCUMENTS

| GB | 2420624 | 5/2006 |
|----|---------|--------|
| GB | 2421039 | 6/2006 |
| WO | 99/63197 | 12/1999 |

OTHER PUBLICATIONS

PCT International Search Report from the equivalent PCT patent application No. of PCT/IB2011/000504 issued on Jun. 25, 2012.

* cited by examiner

*Primary Examiner* — David Andrews
(74) *Attorney, Agent, or Firm* — Jianguang Du; Robin Nava

(57) ABSTRACT

An acoustic sensing tool for use with a carrier disposed in a wellbore may include a base and a resilient clamp disposed around the base. The clamp may move between a retracted position, in which the clamp interior surface engages the carrier, and an expanded position, in which the clamp exterior surface engages the wellbore. A sensor is coupled to the clamp. An actuator is movable along the base and operably coupled to the clamp. The actuator is operable to move the clamp between the retracted and expanded positions and configured to maintain contact with the clamp in both the retracted and expanded positions so that movement of the actuator in a first direction causes the housing to move to the expanded position, and movement of the actuator in a second, opposite direction causes the housing to move to the retracted position.

24 Claims, 8 Drawing Sheets

DOWNHOLE ACOUSTIC SENSING TOOL AND METHOD

FIELD OF THE DISCLOSURE

The present disclosure generally relates to methods and apparatus for evaluating subsurface formations. More particularly, the present disclosure relates to methods and apparatus for deploying and retrieving sensor tools in wellbore environments.

BACKGROUND OF THE DISCLOSURE

Acoustic sensing tools are generally known in hydrocarbon production applications for detecting acoustic activity in formations. Acoustic activity, which includes seismic or microseismic activity, may occur in a formation either passively or as a result of active stimulation. Passive acoustic activity can occur during production as fluid is removed from the formation. During active stimulation, on the other hand, acoustic activity may be induced by any of several known methods. In hydrofracture monitoring, for example, a fracture fluid is injected into the formation to stimulate microseismic activity. Alternatively, a seismic generator may be deployed at the surface or below the surface (such as in the production wellbore or in a separate wellbore) to generate the microseismic activity.

Regardless of how the acoustic activity occurs, acoustic sensing tools may be used to detect information related to the acoustic activity. That information may then be used to understand the characteristics of the fracture (propagation direction, geometry, and dip, among other parameters). During active stimulation applications, the information may further be used to adjust, in real time, the seismic generation parameters in case of a mismatch between the planned and actual fracture. The "real-time" expression refers here to enabling a reaction in a time which is fast enough to have an impact on the economics of the fracturing job (for instance stopping seismic generation where the fracture appears to be in danger of extending into a water zone).

Various acoustic sensing tools (or "sondes") are known for use downhole. These tools may be deployed via a wireline or similar means, or may be attached to production tubing as it is installed into a wellbore. When deployed by tubing, for example, the acoustic sensing tool must be capable of moving from a retracted position, which permits movement along the wellbore, to an expanded position, in which the acoustic sensing tool engages a surface of the wellbore to facilitate acoustic coupling between the sensor and the formation. Many conventional sensor tools are permanent installations once deployed, and therefore cannot be repositioned or retrieved after use. Other tools purport to be retrievable, but such retrieval requires dragging the acoustic sensing tool along the wellbore in the expanded position, or is otherwise overly difficult.

SUMMARY OF THE DISCLOSURE

According to certain embodiments disclosed herein, an acoustic sensing tool for use with a carrier disposed in a wellbore may include a base adapted to engage the carrier and a resilient clamp disposed around the base and defining an interior surface and an exterior surface, the clamp being movable between a retracted position, in which the clamp interior surface engages the carrier, and an expanded position, in which the clamp exterior surface engages the wellbore. A sensor housing may be coupled to the clamp and a sensor may be disposed in the sensor housing. An actuator is movable along the base and operably coupled to the clamp, the actuator being operable to move the clamp between the retracted and expanded positions and configured to maintain contact with the clamp in both the retracted and expanded positions so that movement of the actuator in a first direction causes the housing to move to the expanded position, and movement of the actuator in a second, opposite direction causes the housing to move to the retracted position.

According to additional embodiments disclosed herein, an acoustic sensing tool for use with a carrier disposed in a wellbore may include a base adapted to engage the carrier and a resilient clamp disposed around the base and defining an interior surface and an exterior surface, the clamp being movable between a retracted position, in which the clamp interior surface engages the carrier, and an expanded position, in which the clamp exterior surface engages the wellbore, the clamp further being configured to have an inward bias toward the retracted position. A sensor housing may be coupled to the clamp and a sensor disposed in the sensor housing. An actuator is movable along the base and operably coupled to the clamp, the actuator being operable to move the clamp between the retracted and expanded positions and configured to maintain contact with the clamp in both the retracted and expanded positions so that movement of the actuator in a first direction causes the housing to move to the expanded position, and movement of the actuator in a second, opposite direction causes the housing to move to the retracted position, wherein the actuator generates an actuation force sufficient to move the clamp to the expanded position.

According to still further embodiments disclosed herein, a method of deploying an acoustic sensing tool in a wellbore extending into a formation may include providing an acoustic sensing tool having a clamp and an actuator, in which the clamp is movable between a retracted position and an expanded position. The clamp may be placed in the expanded position, inserted over a carrier, and placed in the retracted position to engage the carrier. The carrier may then be inserted into the wellbore to a desired position and placed in the expanded position to engage the wellbore.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are illustrated graphically, diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

So that the above recited features and advantages of the present disclosure can be understood in detail, a more particular description of the disclosure may be had by reference to the embodiments thereof that are illustrated in the accompanied drawings. It is to be noted, however, that the drawings illustrate only typical embodiments of this disclosure and are therefore not to be considered limiting of its scope, for the disclosure may admit to other equally effective embodiments.

Acoustic sensing tools and deployment methods are disclosed herein having a clamp that is movable between retracted and expanded positions. The clamp may be attached to tubing, be it production, coiled, or the like. The clamp is easily reversed to the retracted position so that the tool may be repositioned within a wellbore or retrieved. The acoustic sensor may detect acoustic activity, such as seismic or microseismic activity, emanating from a subterranean formation. Additionally or alternatively, the sensor may measure acoustic activities originating form an active source located on surface or in a cross-well and reflected on the formation of study, as may be performed as a side activity on the hydraulic fracture, which may allow orientation of sensors for data interpretation. The apparatus and methods are described herein in the context of a hydrofracture process. It will be appreciated, however, that the apparatus and methods may be used in other processes during hydrocarbon exploration and production, including other types of active monitoring during formation fracturing processes as well as monitoring acoustic activity during fluid production, which may result in passive formation fracturing.

Figure 1:
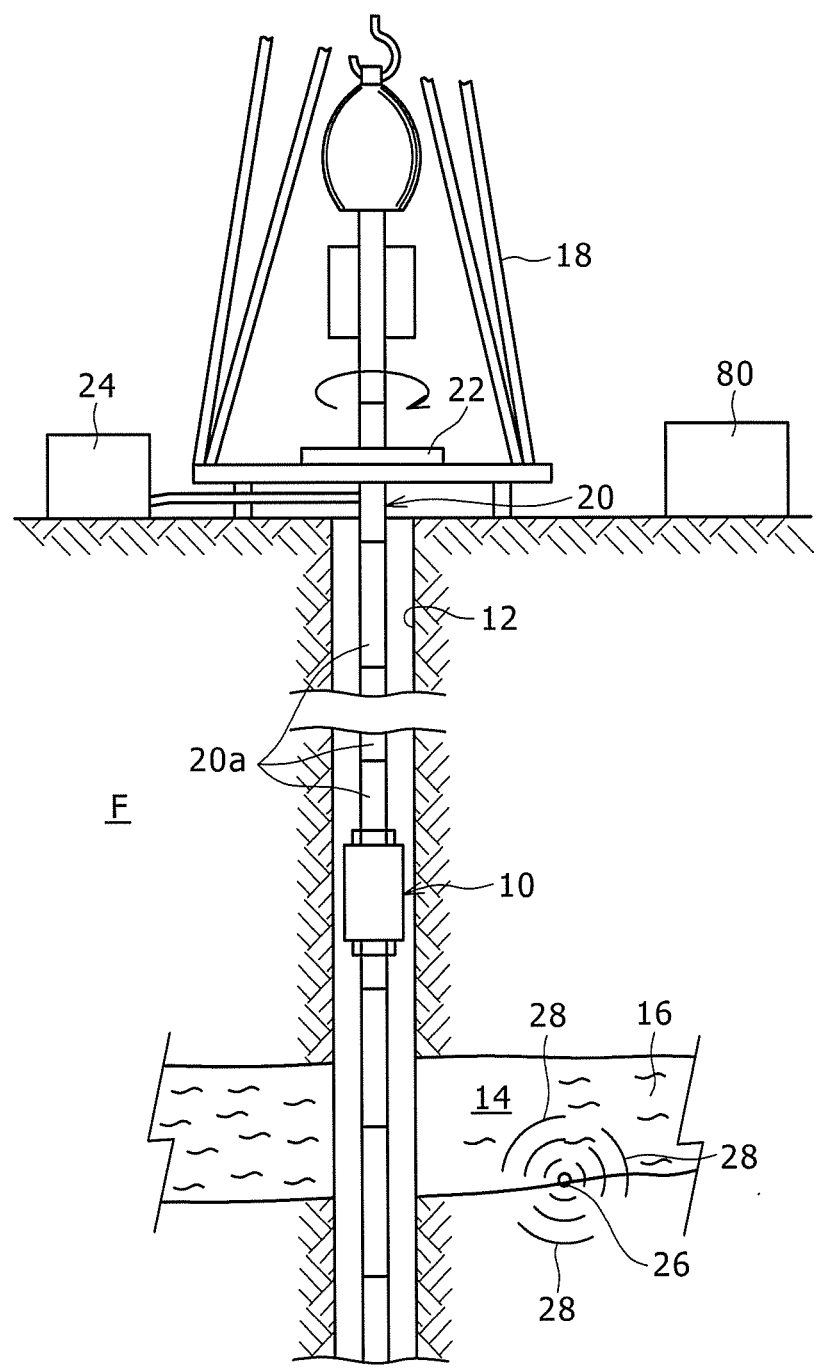
FIG. 1 is a schematic side elevation view, in partial cross-section, of a rig deploying production tubing and an acoustic sensing tool constructed according to the present disclosure.

FIG. 1 illustrates an acoustic sensing tool 10 disposed in a wellbore 12. The wellbore 12 traverses a formation F having a reservoir or area 14 containing a formation fluid 16. The wellbore 12 may be lined, such as with mudcake or casing. A rig 18 is shown inserting a string of production tubing 20 into the wellbore 12. The tubing 20 includes several individual tubing sections 20a that are connected to the existing string 20 at a platform 22 and then lowered into the wellbore 12.

The production tubing 20 may be used to deliver fluid into, or retrieve fluid from, one or more areas in the formation F. For example, the production tubing 20 may be used to deliver a hydrofracture fluid into the reservoir 14. Alternatively, the production tubing 20 may be used to deliver formation fluid 16 from the reservoir 14 to the surface. The tubing 20 may be used for these or other processes used during formation evaluation, formation development, and hydrocarbon production applications.

FIG. 1 shows the tool 10 used during a hydrofracture monitoring process. Accordingly, a fracture fluid controller 24 is provided for controlling flow of fracture fluid from a fluid source, which may be delivered using a pump. The pump is operable to inject fracture fluid into the reservoir 14 via the tubing 20, thereby increasing fluid pressure in the reservoir 14 to open fractures resulting in recordable acoustic activity. An exemplary point 26 of the formation located at the reservoir 14 is shown exhibiting acoustic activity in FIG. 1. More specifically, the point 26 is propagating microseismic waves 28, which may include compression wave ("P-wave") and shear wave ("S-wave") components.

The acoustic sensing tool 10 is disposed in the wellbore 12 for detecting acoustic activity in the formation, such as the microseismic waves 28 emanating from the formation point 26. In the embodiment of FIG. 1, the acoustic sensing tool 10 may be attached to a carrier, such as the tubing section 20a. Initial attachment of the acoustic sensing tool 10 to the tubing section 20a may occur when the tubing section 20a is located at the platform 22. The tubing section 20a and attached acoustic sensing tool 10 may then be lowered together into the wellbore 12 until the acoustic sensing tool 10 is at the desired depth in the wellbore 12.

Figure 2:
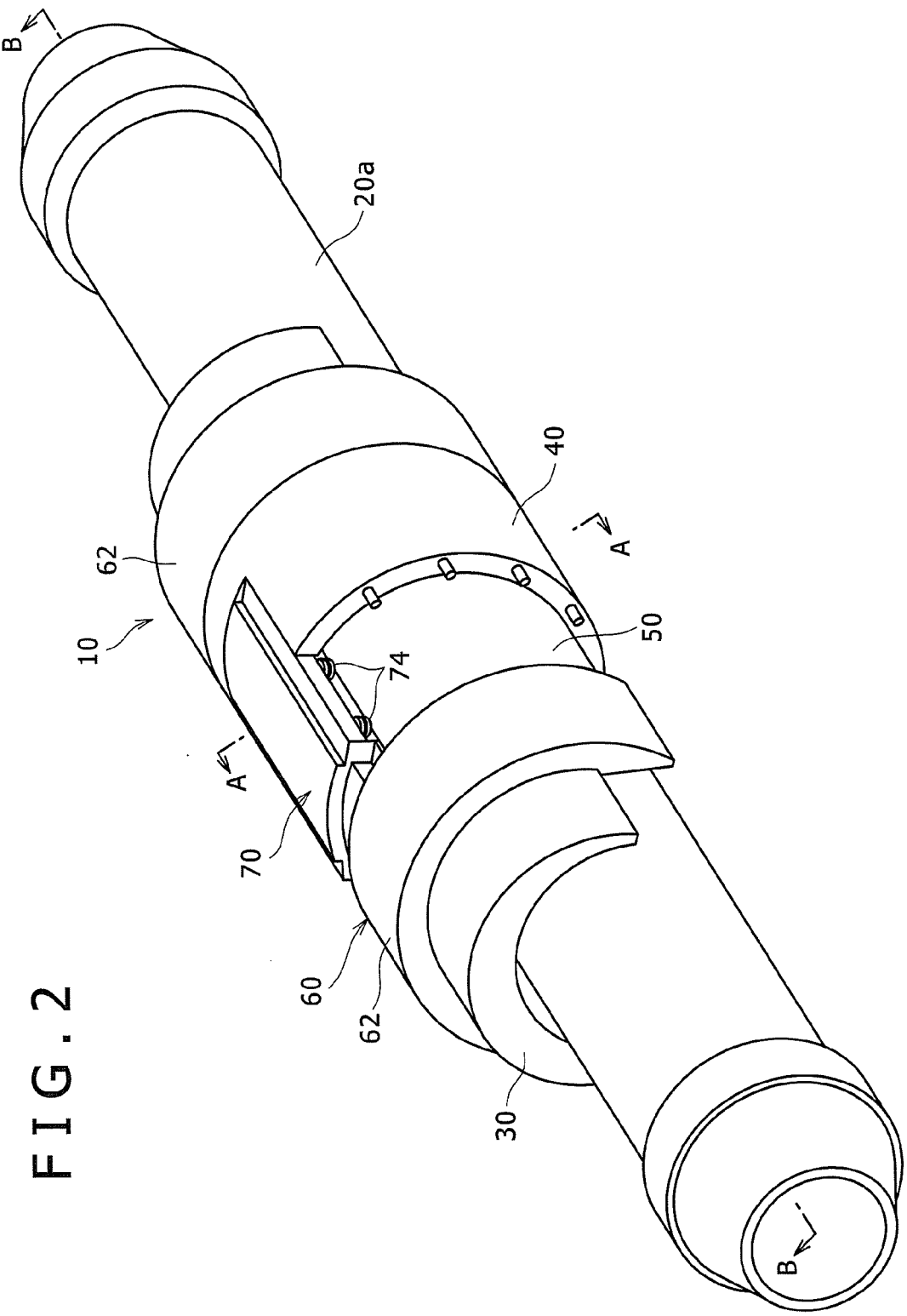
FIG. 2 is a perspective view of the acoustic sensing tool with portions removed for clarity.
Figure 3:
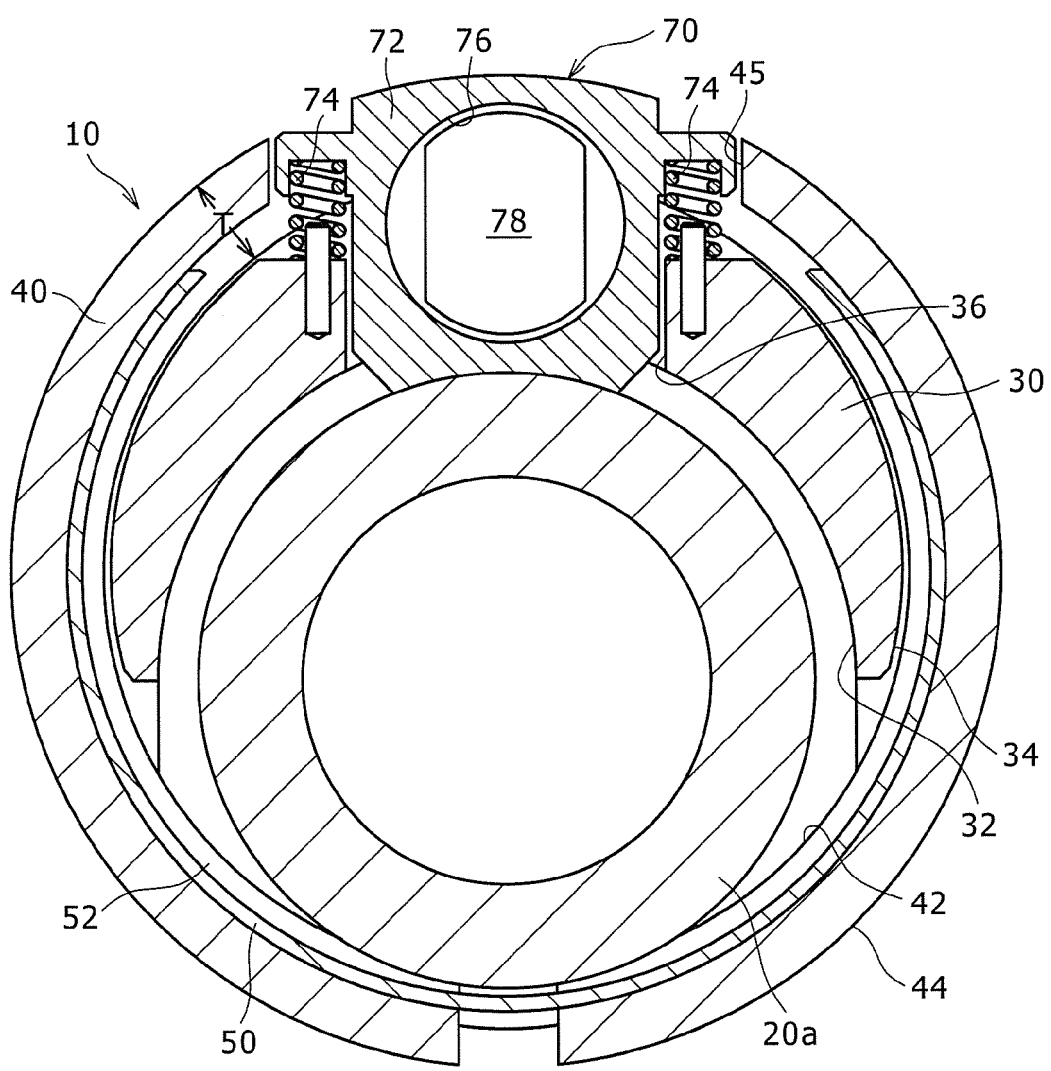
FIG. 3 is cross-sectional view of the acoustic sensing tool taken along line A-A of FIG. 2.

As shown in greater detail in FIGS. 2 and 3, the acoustic sensing tool 10 includes a base 30 providing a common structural support for the components of the acoustic sensing tool 10. In the illustrated embodiment, the base 30 includes an interior surface 32 disposed toward and configured to at least partially surround a circumference of the tubing section 20a. The base 30 further includes an exterior surface 34 facing away from the tubing section 20a. An aperture 36 extends through the base 30.

Figure 5:
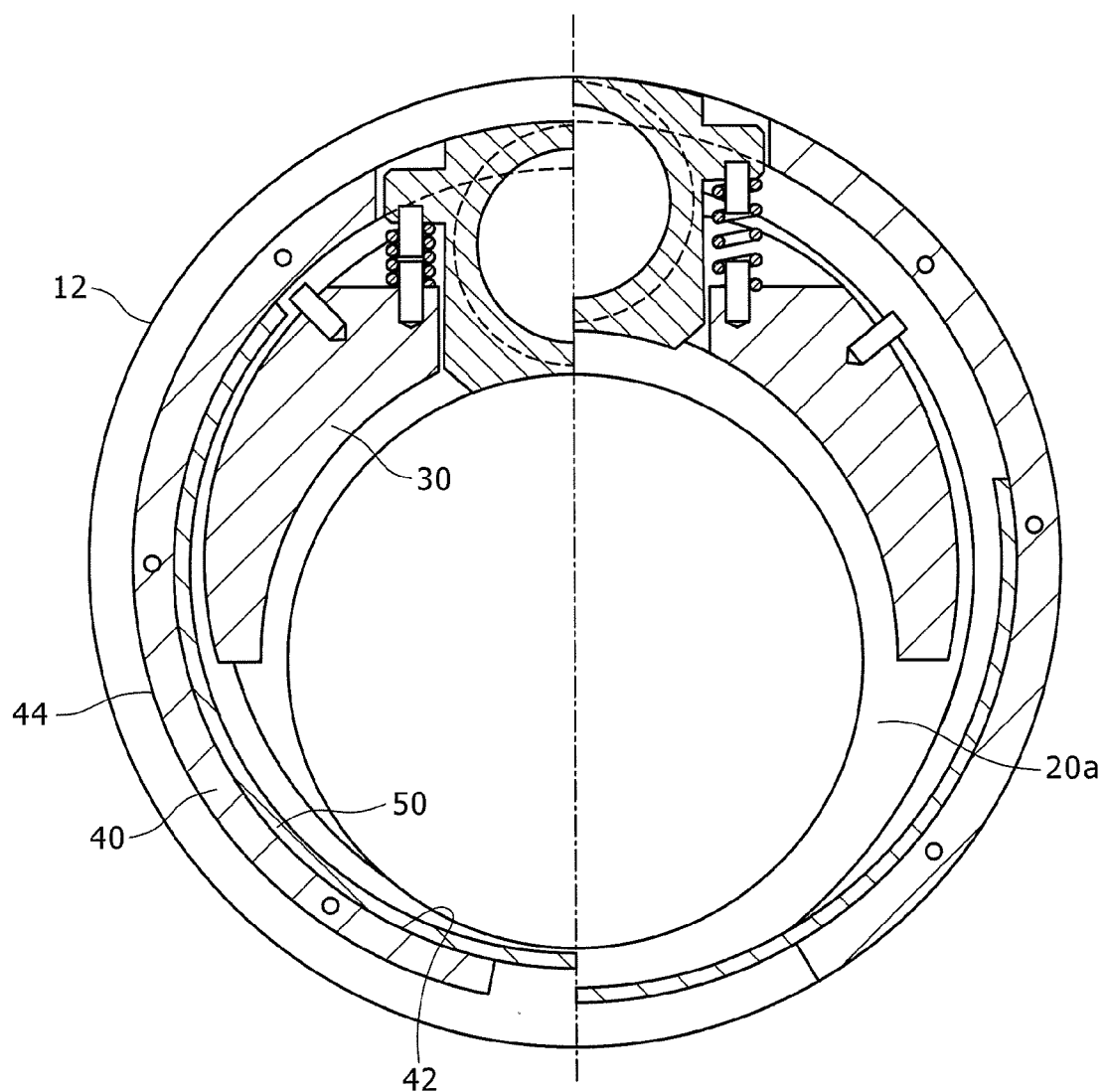
FIG. 5 is a cross-sectional view of the acoustic sensing tool disposed in a wellbore showing the retracted position on the left-hand side and the expanded position on the right-hand side.

A resilient clamp, such as a C-shaped member 40, is disposed around the base 30 (a portion of the C-shaped member 40 is removed from FIG. 2 to show additional details of the acoustic sensing tool 10). The C-shaped member 40 defines an interior surface 42 disposed radially inwardly and an exterior surface 44 disposed radially outwardly. The C-shaped member 40 is movable between a retracted position as shown in the left-hand side of FIG. 5, in which at least a portion of the interior surface 42 engages the tubing section 20a, and an expanded position as shown in the right-hand side of FIG. 5, in which at least a portion of the exterior surface 44 engages the wellbore. The C-shaped member 40 may further include an aperture 45 that is substantially aligned with the base aperture 36.

Figure 4:
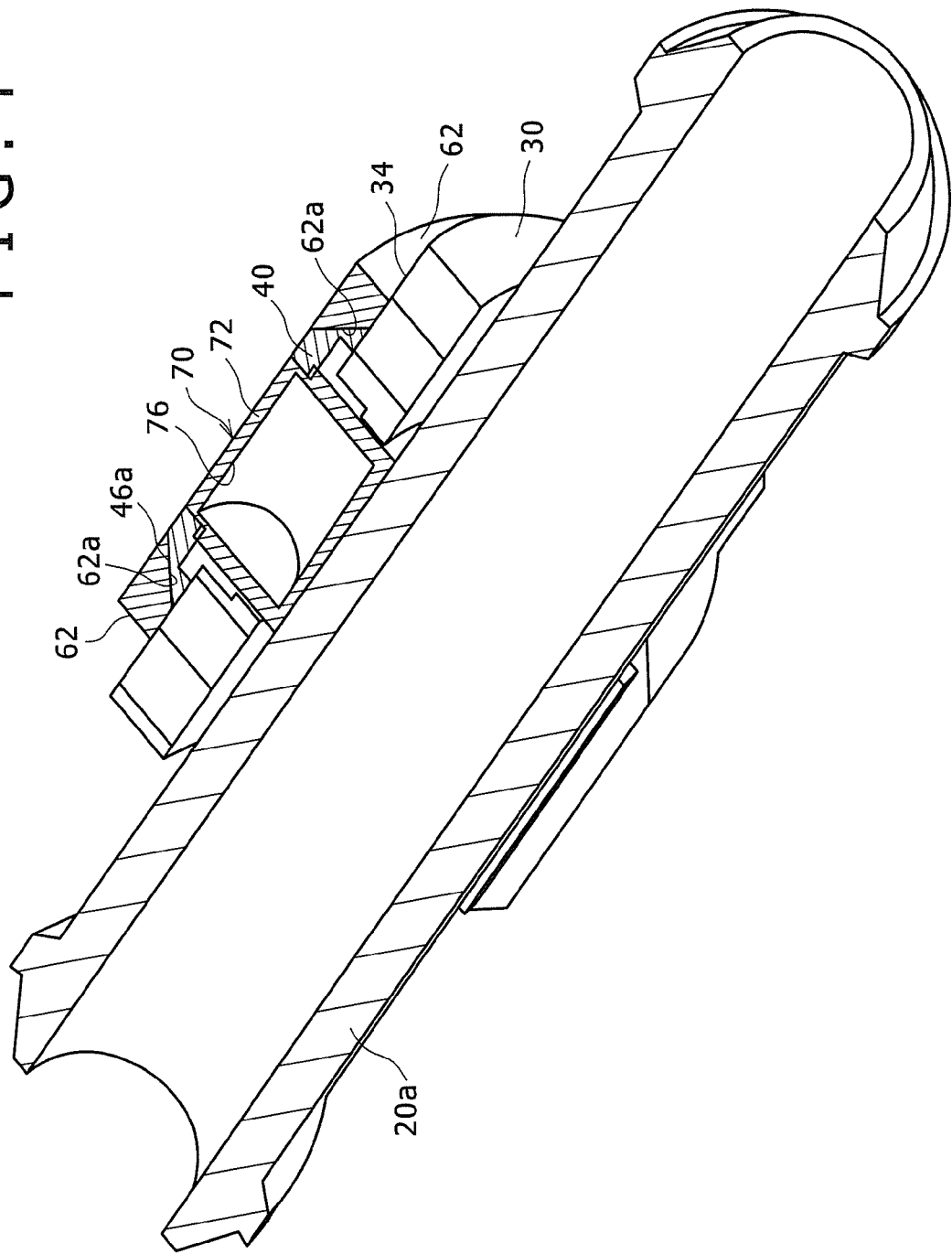
FIG. 4 is a cross-sectional view of the acoustic sensing tool taken along line B-B of FIG. 2.

As best shown in FIG. 4, the C-shaped member 40 has lateral edges 46a, 46b that define truncated conic surfaces extending in opposite directions. While the lateral edges 46a, 46b in the illustrated embodiment are convex (i.e., face outwardly, away from the base 30), they may alternatively be formed concave to face inwardly toward the base 30.

A spring element 50 may be operatively coupled to the C-shaped member 40 to obtain desired operational parameters for the C-shaped member 40. As best shown in FIG. 3, the spring element 50 is disposed in a recess 52 formed in the interior surface 42 of the C-shaped member. The spring element 50 may also have a C-shape as shown in FIG. 3, but may be oriented opposite the C-shaped member 40 so that the spring element 50 extends across the gap between the opposed free ends of the C-shaped member. When configured in this manner, the spring element 50 and C-shaped member 40 completely surround a periphery of the tubing section 20a. The C-shaped member 40 (and optional spring element 50) may further be configured to be normally biased toward either the retracted or the expanded positions.

The C-shaped member 40 and/or the spring element 50 may be constructed to be sufficiently flexible to move between the retracted and expanded positions without requiring excessive force. The construction of the C-shaped member 40 and spring element 50 may include a combination of material and structural components to achieve the desired flexibility. Suitable materials include metal or plastic (such as PEEK). The material may be selected so that it is compatible with the downhole environment and provides sufficient stiffness to provide the desired expansion while preserving the rigidity of the structure on the casing. In certain embodiments, it may be advantageous to provide a relatively stiff material. The structural component may include providing multiple layers of material. The number and configuration of the layers may be determined by the type(s) of material selected.

An actuator 60 is provided for moving the C-shaped member 40 between retracted and expanded positions. In the illustrated embodiment, the actuator 60 includes a pair of diametrically opposed rings 62 engaging opposite sides of the C-shaped member 40. The rings 62 include lateral edges 62a, 62b that are complementary to the lateral edges 46a, 46b of the C-shaped member, and are slidable along the base exterior surface 34 to actuate the C-shaped member 40. In the embodiment illustrated in FIG. 4, the lateral edges 62a, 62b are concave (i.e., face inwardly toward the base) to closely fit the convex lateral edges 46a, 46b of the C-shaped member 40. The thickness T (FIG. 3) of the C-shaped member 40 may be selected to provide a desired amount of contact area across which the expansion/retraction of the C-shaped member 40 is controlled. Radial movement of the C-shaped member 40 may be effected by the lateral edges 62a, 62b of the actuator rings 62 engaging the lateral edges 46a, 46b of the C-shaped member 40. Furthermore, by supporting the actuator 60 from the base 30, the acoustic sensing tool 10 is self-contained and therefore easy to install onto and remove from the tubing 20. The self-contained actuator 60 further facilitates use of the acoustic sensing tool 10 with different tubing strings.

The acoustic sensing tool 10 further includes a sensor unit 70 for detecting acoustic activity in the formation. As best shown in FIGS. 2-4, a sensor housing 72 is disposed in the base aperture 36 and C-shaped member aperture 45. The housing 72 may be coupled to the base 30 by resilient members such as springs 74. The housing 72 may have a slightly larger profile than the C-shaped member 40 to ensure that the housing 72 will contact the wellbore 12 when the C-shaped member 40 is competely deployed to the expanded position. The springs 74 may isolate the sensor housing 72 from the rest of the acoustic sensing tool 10, thereby to minimize noise. The housing 72 defines a chamber 76 sized to receive a sensor 78 (FIG. 3). The sensor 78 may include one or more sensors for detecting seismic, acoustic, or related energy. Exemplary sensors include hydrophones, geophones (including optical), MEMS, pressure/temperature sensors, or other types of sensors, or combinations thereof.

The actuator 60 may be operated to move the lateral edges 62a, 62b toward or away from one another, thereby to move the C-shaped member 40 between the retracted and expanded positions. In the embodiment shown in FIG. 4, the C-shaped member 40 is normally in the expanded position and the actuator rings 62 are driven toward one another to force the C-shaped member 40 to the retracted position. During this movement of the actuator rings 62, the lateral edges 62a, 62b operate as cam surfaces and the lateral edges 46a, 46b of the C-shaped member 40 act as follower surfaces, so that the ring lateral edges 62a, 62b drive the C-shaped member lateral edges 46a, 46b inwardly. An opposite arrangement is illustrated by the alternative embodiment shown in FIG. 6, where C-shaped member 40 is normally in the retracted position and the actuator rings 62 are operated to drive the C-shaped member to the expanded position. The angle of the lateral edges 46a, 46b, 62a, 62b may affect the actuation force and displacement required to move the C-shaped member 40 between retracted and expanded positions. Steeper angles (i.e., where the angle is closer to a plane normal to the axis of the acoustic sensing tool) require greater actuation force and less actuator displacement, while shallower angles require lesser actuation force and greater actuator displacement.

In both embodiments, the actuator rings 62 and the C-shaped member 40 have thicknesses sufficient to maintain contact throughout operation, thereby facilitating the return of the C-shaped member 40 to its normal state. In the embodiment of FIG. 4, for example, the actuator rings 62 may initially be driven toward one another to maintain the C-shaped member 40 in the retracted position. After the acoustic sensing tool 10 reaches the desired wellbore depth, the actuator rings 62 may be driven away from each other to permit the C-shaped member 40 to assume its normal, expanded position, thereby to engage the surface of the wellbore. The actuator rings 62 may subsequently be driven back toward each other to return the C-shaped member to the retracted position, thereby facilitating removal or repositioning.

Figure 6:
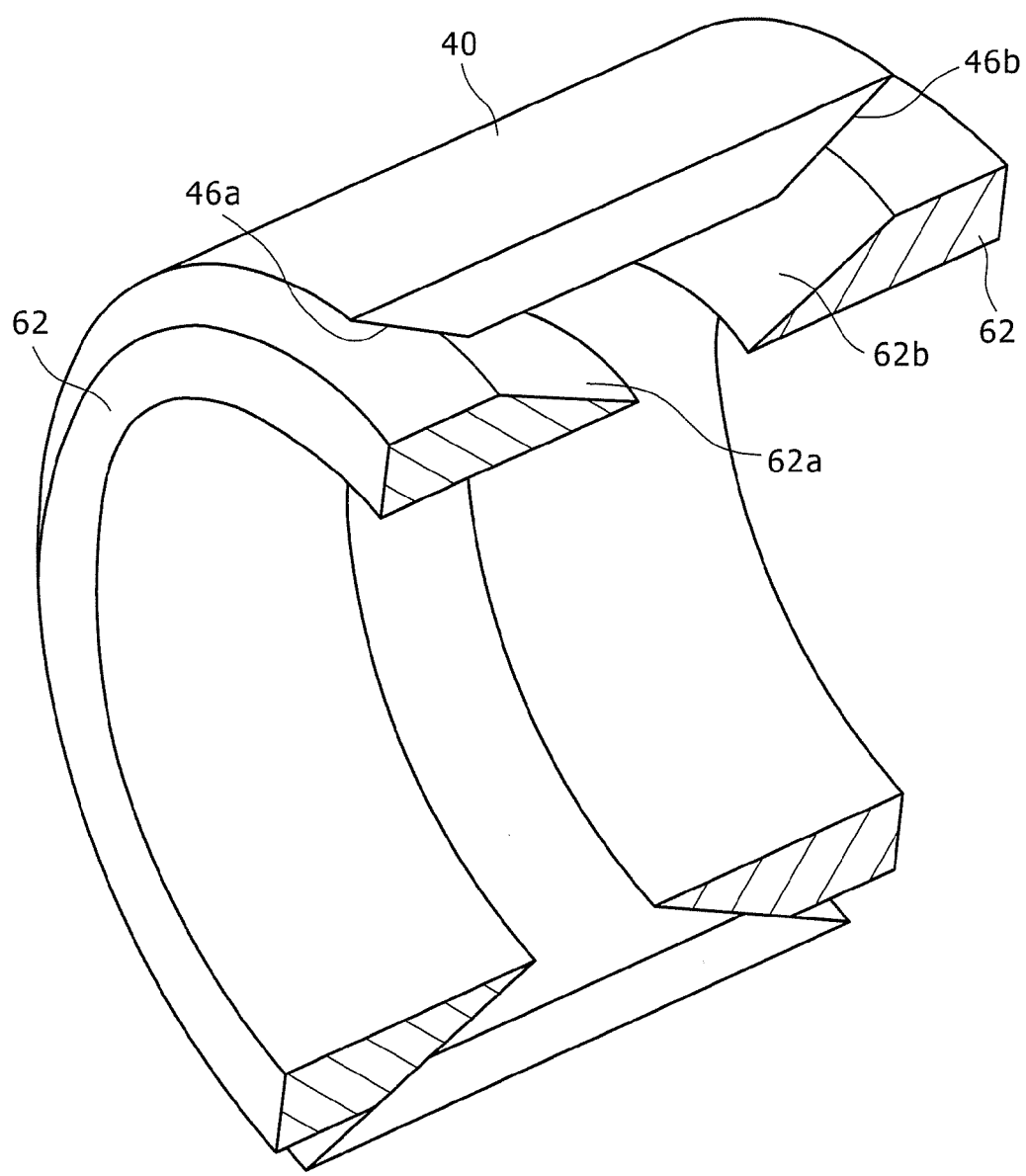
FIG. 6 is a cross-sectional view of a clamp and actuator of an alternative acoustic sensing tool.

In the alternative embodiment illustrated in FIG. 6, the actuator rings 62 are initially maintained relatively far from each other as the C-shaped member 40 is normally in the retracted position. The actuator rings 62 are then driven toward each other to drive the C-shaped member 40 to the expanded position. The actuator rings 62 may subsequently move back away from each other to allow the C-shaped member 40 to return to its normal, retracted position.

The actuator 60 and C-shaped member 40 (with or without spring element 50) may be configured to obtain the desired type of contact with the tubing section 20a in the retracted position and the wellbore surface in the expanded position. For example, the C-shaped member 40 may be formed such that it expands substantially uniformly so that a substantially continuous contact is formed between the outer surface of the C-shaped member 40 and the surface of the wellbore 12. Similarly, when the C-shaped member 40 is in the retracted position, an inner surface of the C-shaped member 40 and the base 30 may substantially continuously contact the tubing section 20a. Uniform expansion or retraction of the C-shaped member 40 may be achieved by adjusting the thickness and/or material selection of the C-shaped member 40 so that the C-shaped member 40 remains in the elastic domain in both the expanded and retracted positions. By providing a substantially continuous contact, the area of contact is increased as well as the friction force to hold the acoustic sensing tool 10 in the desired position. Holding the acoustic sensing tool 10 more securely in place may decrease noise or other externalities that may otherwise degrade the quality of data received by the sensor 78.

Alternatively, the C-shaped member 40 may have discrete points or lines of contact formed with the wellbore and/or tubing section 20a. For example, three discrete lines of contact may be formed between the exterior surface of the C-shaped member 40 and the wellbore 12 in the expanded position and between the interior surface of the C-shaped member 40 and the tubing section 20a. Two of the lines of contact may be provided near free ends 48 of the C-shaped member, which may deflect the most during operation of the actuator 60. A third line of contact may be formed at a point that is generally diametrically opposite the free ends 48, such as at the sensor housing 72 or a portion of the C-shaped member 40 located adjacent the sensor housing 72. The locations for the lines of contact suggested above are merely exemplary, as other locations may be used.

While discrete lines of contact, such as the three lines described above, may decrease the friction force that holds the acoustic sensing tool 10 in place, it may advantageously permit customization of the acoustic sensing tool 10 for use in differently sized boreholes. For example, a set of localized projections may be temporarily attached to the C-shaped member 40 and/or sensor housing 72 to adapt the acoustic sensing tool 10 for a wellbore or tubing of a given size. That set of projection may be removed and replaced with a different set of projections when the acoustic sensing tool 10 is used in a wellbore or tubing of a different size. As a result, the acoustic sensing tool 10 may be used in wellbores of different sizes.

The acoustic sensing tool 10 may be configured to form any combination of continuous or discrete contact in the expanded and retracted positions. For example, the C-shaped member 40 may continuously contact the wellbore 12 in the expanded position and continuously contact the tubing section 20a in the retracted position. Alternatively, the C-shaped member 40 may discretely contact the wellbore 12 in the expanded position and continuously contact the tubing section 20a in the retracted position. Additionally, the C-shaped member 40 may use a combination of continuous and discrete contact. For example, the C-shaped member may continuously contact the wellbore 12 in the expanded position and discretely contact the tubing section 20a in the retracted position. Still further, the C-shaped member 40 may provide the reverse combination by discretely contacting the wellbore 12 in the expanded position and continuously contacting the tubing section 20a in the retracted position.

As noted briefly above, the acoustic sensing tool 10 may be advantageously configured to have a normal position corresponding to the retracted position. When so configured, the actuator 60 is operated to move the C-shaped member 40 to the expanded position to facilitate insertion of the acoustic sensing tool 10 over the tubing 20. The actuator 60 is then released to allow the C-shaped member 40 to naturally assume the retracted position, thereby clamping the acoustic sensing tool to the tubing section 20a. As the tubing section 20a is inserted into the wellbore 12 to the desired depth, the actuator 60 may again be operated to expand the C-shaped member 40 to the expanded position so that the sensor housing 72 engages the wellbore 12. The sensor 78 may then collect acoustic data from activity in the formation that is either actively stimulated or passively observed.

A data processing system 80 may be operatively coupled to the sensor 78 to receive, store, and/or process signals from the sensor 78. Accordingly, the data processing system 80 may include control, communication, and processing circuitry, a power supply, a processor, a RAM, a recorder, and the like. In certain embodiments, the data processing system 80 may omit one or more of the foregoing components. For example, if an optical geophone is used, it may be coupled to the data processing system 80 using optical fiber, in which case electrical power is not needed to transmit the signals. Any other technology of passive sensors (that do not require power from the surface to send the signal along several hundreds of meters) may bring the same benefit. The processor may be a suitably programmed general purpose computer system, a special purpose digital or analog computer, or other device. The data may be immediately communicated to the data processing system 80 (such as by telemetry), or may be recorded and later downloaded to the system, such as after the acoustic sensing tool 10 has been retrieved from the wellbore 1.

Due to changes in temperature, the tubing 20 may contract and therefore produce a relative motion between the tubing section 20a and tool 10. The tool 10 may be collapsed back on the tubing section 20a, at thermal equilibrium when it has the exact same position as before deployment. Controlling position on tubing could be a key to control of the deployment depth in multiple stage fracturing. When data collection is complete, the actuator 60 may again be released so that the C-shaped member 40 is again clamped to the tubing section 20a. The tubing section may then be relocated to a different depth within the wellbore 12, at which time the C-shaped member 40 may again be deployed for data collection. Alternatively, the tubing section 20a may be retrieved from the wellbore 12 and the actuator 60 may be operated to remove the acoustic sensing tool 10 from the tubing 20. The acoustic sensing tool 10 may then be redeployed in the same or a different wellbore for additional data collection. While the C-shaped member 40 in this example has a normally retracted position, it will be appreciated that the C-shaped member may also have a normally expanded position, in which case the actuator is used to place the C-shaped member 40 in the retracted position and released to allow the C-shaped member 40 to assume the expanded position. In either example, the acoustic sensing tool 10 is reversible to facilitate rapid repositioning or removal of the acoustic sensing tool 10.

Figure 7:
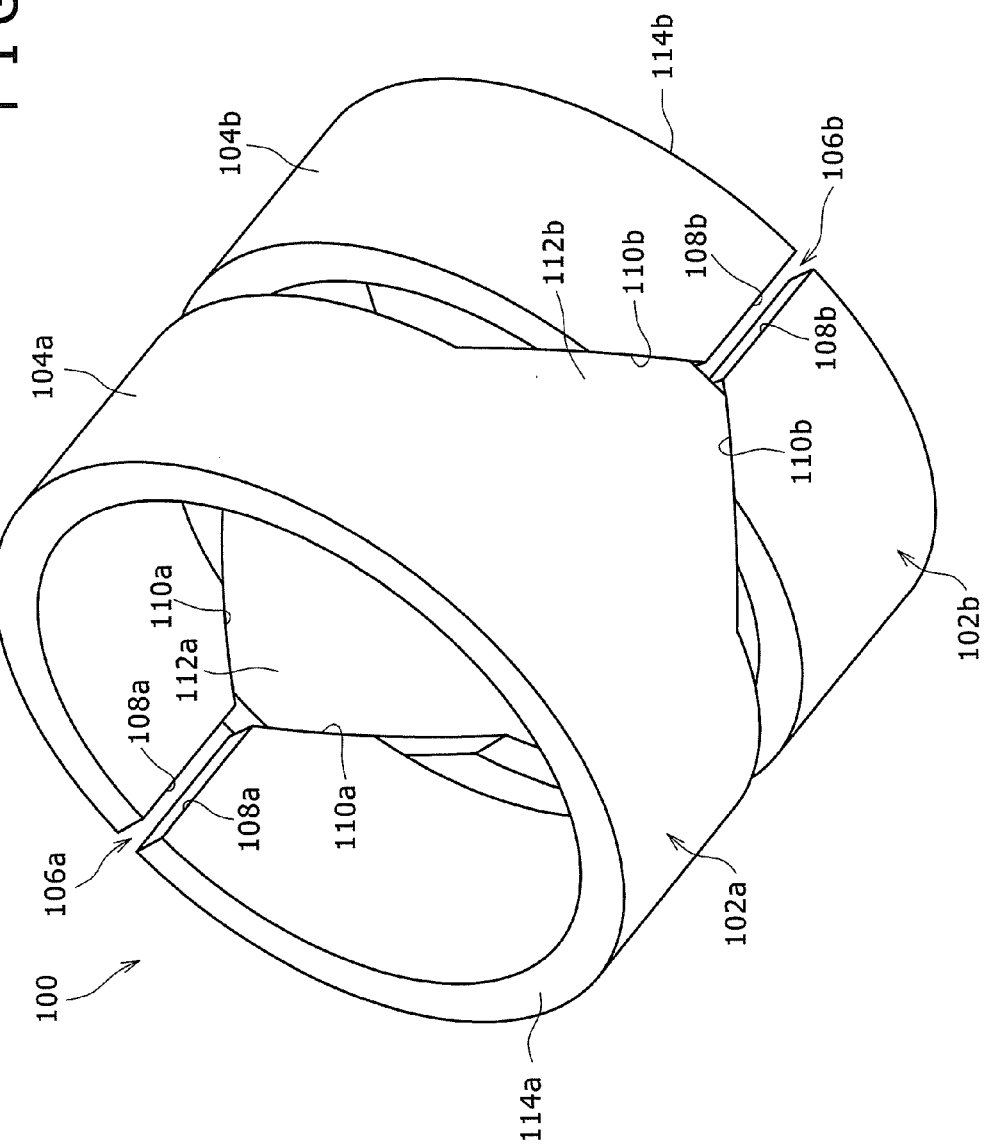
FIG. 7 is a perspective view of an alternative clamp.

An alternative clamp 100 for use in the acoustic sensing tool 10 is illustrated in FIG. 7. The clamp 100 comprises a pair of clamp rings 102a, 102b which replace the C-shaped member 40 of the previous embodiments. Each clamp ring 102a, 102b includes a nearly completely cylindrical body 104a, 104b defining a gap 106a, 106b between opposed free ends 108a, 108b. Angled surfaces 110a, 110b are formed near the free ends 108a, 108b. Each clamp ring 102a, 102b further includes a wedge 112a, 112b sized and configured to engage the angled surfaces 110a, 110b of the other clamp ring 102a, 102b. More specifically, clamp ring 102a includes a wedge 112a that engages the angled surfaces 110b of clamp ring 102b. Conversely, clamp ring 102b includes the wedge 112b that engages angled surfaces 110a of the clamp ring 102a. Each clamp ring 102a, 102b further includes a contact surface 114a, 114b adapted to engage an actuator, such as the actuator 60 noted above.

In the embodiment of FIG. 7, the clamp 100 is configured to have a normal position corresponding to the retracted position. The angled surfaces 110a, 110b and wedges 112a, 112b are configured to drive the clamp rings 102a, 102b to the expanded position in response to the actuator pressing the clamp rings 102a, 102b toward one another. When the actuator releases the clamp rings 102a, 102b, the clamp rings return to the retracted position. In the alternative, it will be appreciated that the clamp rings 102a, 102b may be configured to have a normal position corresponding to the expanded position.

The alternative clamp 100 illustrated in FIG. 7 may provide advantages over the C-shaped member 40 disclosed above. More specifically, when the alternative clamp 100 is deployed to the expanded position, each clamp ring 102a, 102b overlies the gap 106a, 106b of the other clamp ring, thereby forming a continuous cylindrical engagement with the wellbore 12. Additionally, the clamp rings 102a, 102b may engage each other with sufficient force such that the free ends 110a, 110b are more rigidly held against vibrations, thereby increasing the natural resonance frequency of the clamp 100 as compared to the C-shaped member 40. Still further, the actuation force may increase the level of stress in the clamp rings 102a, 102b, thereby further increasing the natural resonance frequency of the clamp 100.

Figure 8:
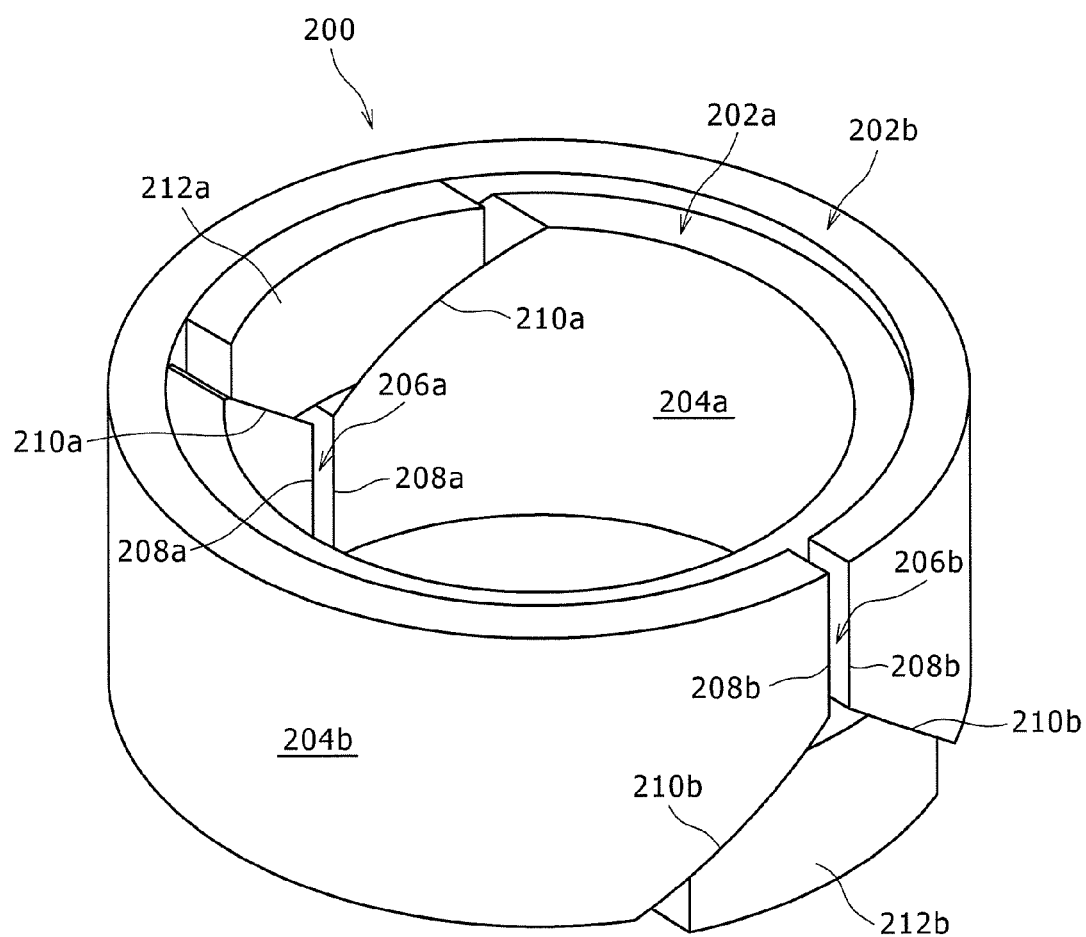
FIG. 8 is a perspective view of an alternative embodiment having nested clamps.

Yet another alternative clamp 200 is illustrated in FIG. 8. The clamp 200 includes nested inner and outer clamp rings 202a, 202b. Each clamp ring 202a, 202b is configured similarly to the clamp rings 102a, 102b shown in FIG. 6, however the clamp rings 202a, 202b of the present embodiment have different diameters so that the inner clamp ring 202a is disposed inside the outer clamp ring. Accordingly, each clamp ring 202a, 202b includes a nearly completely cylindrical body 204a, 204b defining a gap 206a, 206b between opposed free ends 208a, 208b. Angled surfaces 210a, 210b are formed near the free ends 208a, 208b. An actuator includes inner and outer wedges 212a, 212b sized and configured to engage the angled surfaces 210a, 210b of the clamp rings 202a, 202b.

In clamp 200 of FIG. 8 is configured to have a normal position corresponding to the retracted position. The angled surfaces 210a, 210b and wedges 212a, 212b are configured to drive the clamp rings 202a, 202b to the expanded position in response to the actuator wedges 212a, 212b engaging the angled surfaces 210a, 210b. When the actuator wedges 212a, 212b release the clamp rings 202a, 202b, the clamp rings return to the retracted position. In the alternative, it will be appreciated that the clamp rings 202a, 202b may be configured to have a normal position corresponding to the expanded position.

The clamp 200 of FIG. 8 not only may provide the benefits associated with the continuous cylindrical contact noted above with respect to the embodiment of FIG. 7, but also may facilitate a more controlled deployment of the clamp 200. The inner clamp ring 202a may first be actuated to engage the outer clamp ring 202b, thereby holding the outer clamp ring 202b in place as it moves to the expanded position. Consequently, the clamp 200 is less likely to slip downwardly during deployment.

In additional alternative embodiments, the actuator may include multiple actuator structures for expanding and retracting the C-shape member. For example, the structure may actually be an arrangement of the same C-shape member construction having several layers or a stack of similar parts. One may even think of using various constructions, such as those shown in FIGS. 7 and 8, to form a hybrid structure. This approach could be used to design a thicker C-shape member without increasing the stiffness of the C-shape member. Indeed, the C-shape member thickness may be driven first by the desired radial expansion (clearance between the borehole and the tool on tubing) and secondly by the area of contact needed between the actuators and deformable C-shape member in order to properly transmit the deformation energy.

Moreover, inventive aspects lie in less than all features of a single disclosed embodiment. Thus, the claims following the Detailed Description are hereby expressly incorporated into this Detailed Description, with each claim standing on its own as a separate embodiment. The embodiments and aspects were chosen and described in order to best explain the principles of the invention and its practical application. The preceding description is intended to enable others skilled in the art to best utilize the principles in various embodiments and aspects and with various modifications as are suited to the particular use contemplated. It is intended that the scope of the invention be defined by the following claims.

What is claimed is:

1. An acoustic sensing tool for use with a carrier having an exterior surface disposed in a wellbore, the acoustic sensing tool comprising:
    a base adapted to engage the carrier;
    a resilient clamp disposed around the base and defining an interior surface and an exterior surface, the clamp being movable between a retracted position, in which the clamp interior surface engages the exterior surface of the carrier, and an expanded position, in which the champ exterior surface engages the wellbore;
    a spring element that is in direct contact with the clamp
    a sensor housing coupled to the clamp;
    a sensor disposed in the sensor housing; and
    an actuator movable along the base and operably coupled to the clamp, the actuator being operable to move the clamp between the retracted and expanded positions and configured to maintain contact with the clamp in both the retracted and expanded positions so that movement of the actuator in a first direction causes the housing to move to the expanded position, and movement of the actuator in a second, opposite direction causes the housing to move to the retracted position.

2. The acoustic sensing tool of claim 1, in which the actuator includes a lateral edge defining a cam surface, the clamp includes a lateral edge defining follower surface in contact with the cam surface, and the actuator has a radial thickness sufficient to maintain contact with the clamp in the expanded position.

3. The acoustic sensing tool of claim 1, in which the clamp comprises a C-shaped member.

4. The acoustic sensing tool of claim 1, in which the clamp has a spring force biasing the clamp toward the retracted position, and in which the actuator generates an actuation force sufficient to move the clamp to the expanded position.

5. The acoustic sensing tool of claim 1, in which the sensor housing is biased away from the clamp exterior surface.

6. The acoustic sensing tool of claim 1, in which the carrier comprises production tubing.

7. The acoustic sensing tool of claim 1, in which the clamp exterior surface is configured to form substantially uniform contact with the wellbore in the expanded position.

8. The acoustic sensing tool of claim 1, in which the spring element extends across a gap between two opposed free ends of the clamp.

9. An acoustic sensing tool for use with a carrier having an exterior surface disposed in a wellbore, the acoustic sensing tool comprising:
    a base adapted to engage the carrier;
    a resilient clamp disposed around the base and defining an interior surface and an exterior surface, the clamp being movable between a retracted position, in which the clamp interior surface engages the exterior surface of the carrier, and an expanded position, in which the clamp exterior surface engages the wellbore, the clamp further comprising a pair of rings;
    a sensor housing coupled to the clamp;
    a sensor disposed in the sensor housing; and
    an actuator movable along the base and operably coupled to the clamp, the actuator being operable to move the clamp between the retracted and expanded positions and configured to maintain contact with the clamp in both the retracted and expanded positions so that movement of the actuator in a first direction causes the housing to move to the expanded position, and movement of the actuator in a second, opposite direction causes the housing to move to the retracted position, wherein the actuator generates an actuation force sufficient to move the clamp to the expanded position.

10. The acoustic sensing tool of claim 9, in which the pair of rings are positioned side-by-side, and each ring includes two opposed angled surfaces and a wedge to engage the angled surfaces of the other ring.

11. The acoustic sensing tool of claim 10, in which the actuator drives the clamp to the expanded position by pressing the pair of rings toward each other.

12. The acoustic sensing tool of claim 10, in which the clamp is biased toward the retracted position.

13. The acoustic sensing tool of claim 9, in which the pair of rings are nested in each other, and each ring includes two opposed angled surfaces.

14. The acoustic sensing tool of claim 13, in which the actuator includes a pair of wedges, and one wedge is configured to engage the angled surfaces of one ring and the other wedge is configured to engage the angled surfaces of the other ring.

15. The acoustic sensing tool of claim 13, in which the clamp is biased toward the retracted position.

16. A method of deploying an acoustic sensing tool in a wellbore extending into a formation, comprising:
   providing an acoustic sensing tool according to claim 1 or 9;
   placing the clamp in the expanded position;
   inserting the clamp over the carrier;
   placing the clamp in the retracted position to engage the carrier;
   inserting the carrier into the wellbore to a desired position; and
   placing the clamp in the expanded position to engage the wellbore.

17. The method of claim 16, further comprising after placing the clamp in the expanded position to engage the wellbore, returning the clamp to the retracted position to engage the carrier.

18. The method of claim 17, further comprising after returning the clamp to the retracted position, inserting the carrier to a second desired position in the wellbore and placing the clamp in the expanded position.

19. The method of claim 17, further comprising after returning the clamp to the retracted position, withdrawing the carrier from the wellbore, placing the clamp in the expanded position, and removing the clamp from the carrier.

20. The method of claim 17, in which the clamp is naturally biased to the retracted position, and in which the actuator is employed to place the clamp in the expanded position.

21. The method of claim 20, in which the actuator includes a lateral edge defining a cam surface, the clamp includes a lateral edge defining a follower surface in contact with the cam surface, and the actuator has a radial thickness sufficient to maintain contact with the clamp in the expanded position.

22. The method of claim 16, further comprising after placing the clamp in the expanded position to engage the wellbore, obtaining acoustic data from the formation.

23. The method of claim 22, further comprising stimulating the formation to generate acoustic activity.

24. The method of claim 23, in which stimulating the formation and obtaining acoustic data occur simultaneously.

\* \* \* \* \*